(12) United States Patent
Shen (10) Patent No.: US 8,437,701 B2
(45) Date of Patent: May 7, 2013

(54) METHOD AND TERMINAL FOR ACQUIRING FREQUENCY DIFFERENCE

(75) Inventor: Jianhai Shen, Shanghai (CN)

(73) Assignee: Huawei Device Co., Ltd., Shenzhen (CN)

(*) Notice: Subject to any disclaimer, the term of this patent is extended or adjusted under 35 U.S.C. 154(b) by 150 days.

(21) Appl. No.: 13/108,608

(22) Filed: May 16, 2011

(65) Prior Publication Data

US 2011/0217935 A1   Sep. 8, 2011

Related U.S. Application Data

(63) Continuation of application No. PCT/CN2009/074621, filed on Oct. 26, 2009.

(30) Foreign Application Priority Data

Nov. 19, 2008   (CN) .................... 2008 1 0177041

(51) Int. Cl.
*H04B 17/00*   (2006.01)
(52) U.S. Cl.
USPC ....... 455/67.11; 331/25; 331/14; 342/357.62; 342/357.74; 327/157
(58) Field of Classification Search ........... 455/67.11, 455/574, 343.2, 503; 370/335, 311, 342; 375/356, 375; 342/357.62, 357.74; 331/25, 331/14; 327/157

See application file for complete search history.

(56) References Cited

U.S. PATENT DOCUMENTS

| 5,384,552 | A | * | 1/1995 | Iwasaki .......................... 331/25 |
| 5,416,808 | A | * | 5/1995 | Witsaman et al. ............ 375/356 |
| 5,610,954 | A | * | 3/1997 | Miyashita et al. ............ 375/375 |
| 6,725,067 | B1 | * | 4/2004 | Marx et al. .................... 455/574 |
| 2003/0043766 | A1 | * | 3/2003 | McDonough et al. ........ 370/335 |

FOREIGN PATENT DOCUMENTS

| CN | 1082285 A | 2/1994 |
| CN | 1114809 A | 1/1996 |
| CN | 101140304 A | 3/2008 |
| CN | 101431816 A | 5/2009 |
| EP | 0 599 311 A2 | 6/1994 |
| EP | 1392009 A1 | 2/2004 |
| GB | 2433332 A * | 6/2007 |
| JP | 2000-269861 A | 9/2000 |

OTHER PUBLICATIONS

Extended European Search Report regarding European Patent Application No. 09827157, dated Jul. 27, 2012, 6 pages.
International Search Report, PCT/CN2009/074621, dated Feb. 4, 2010, 4 pages.

* cited by examiner

*Primary Examiner* — April G Gonzales
(74) *Attorney, Agent, or Firm* — Slater & Matsil, L.L.P.

(57) ABSTRACT

A method and a terminal for acquiring a frequency difference are disclosed. The method includes acquiring a difference T1 between clock timing before dormancy and clock timing of a base station, recording a dormancy period T between dormancy start and dormancy end, acquiring a difference T2 between clock timing after dormancy and clock timing of the base station, and computing a frequency difference between a low speed clock and a base station clock according to normalization frequencies, T1, T, and T2.

20 Claims, 6 Drawing Sheets

METHOD AND TERMINAL FOR ACQUIRING FREQUENCY DIFFERENCE

CROSS-REFERENCE TO RELATED APPLICATIONS

This application is a continuation of International Application No. PCT/CN2009/074621, filed on Oct. 26, 2009, which claims priority to Chinese Patent Application No. 200810177041.2, filed on Nov. 19, 2008, both of which are hereby incorporated by reference in their entireties.

FIELD OF THE INVENTION

The present invention relates to the field of communications technology, in particular to a method and a terminal for acquiring frequency difference.

BACKGROUND OF THE INVENTION

Since at present handsets need batteries for power supply, they all confront the problem of power consumption. To lower the power consumption of a handset as much as possible, the handset enters into work mode only when necessary. When the handset does not work, it stays in standby mode. The standby mode is classified into network paging reception mode and dormancy mode. Generally, the network paging reception mode takes several milliseconds to tens of milliseconds, while the dormancy mode takes hundreds of milliseconds to several seconds. The power consumption of a handset in work mode is greater than the power consumption of the handset in network paging reception mode, which in turn is greater than the power consumption of the handset in dormancy mode.

To lower the power consumption of a handset, generally the handset will be designed with two clocks, namely a high speed clock for the work mode and the network paging reception mode, and a low speed clock for the dormancy mode. When in work mode or network paging reception mode, a handset can receive clock synchronization information from a base station, and use a phase lock loop within the handset to synchronize a frequency of a high speed clock of the handset to a frequency of the base station, thereby maintaining stable communication between the handset and the base station. When the handset is in dormancy mode, if the low speed clock of the handset is not synchronized to the clock of the base station, the handset begins to receive network paging next time only after it performs clock synchronization. When the handset is in dormancy mode, if it is required that the low speed clock be synchronized to the clock of the base station, the handset has to compute a frequency difference between the low speed clock and the high speed clock, and then adds the frequency difference for compensation to the low speed clock to maintain timing of the handset during dormancy.

Figure 1:
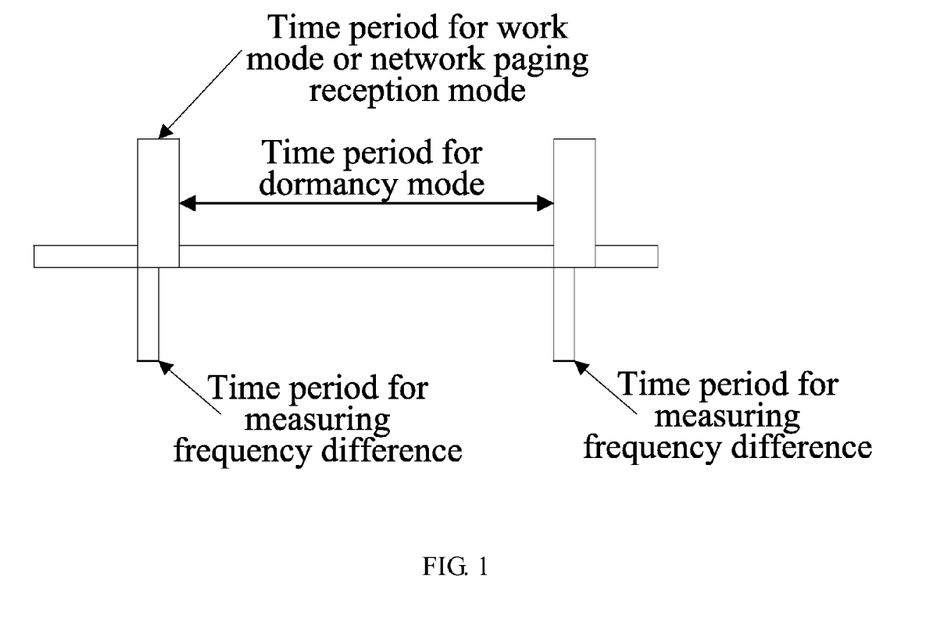
FIG. 1 is a time diagram for acquiring the frequency difference between a low speed clock and a base station clock in prior art.

FIG. 1 is a time schematic diagram for obtaining a frequency difference between a low speed clock and a clock of a base station in the prior art. When a handset is in work mode or network paging reception mode, it obtains a frequency difference between a low speed clock and a high speed clock. When the handset enters into dormancy mode, it adds the frequency difference for compensation to the low speed clock to maintain timing of the handset.

In practicing the present invention, the inventor finds that, the time used to compute the frequency difference between the low speed clock and the clock of the base station is quite limited, which results in that the frequency difference is not precise enough.

SUMMARY OF THE INVENTION

Embodiments of the present invention provide a method and a terminal for acquiring a frequency difference to acquire a relative precise frequency difference between a low speed clock of a handset and a clock of a base station.

To achieve the above objective, the embodiments of the present invention provide the following technical solution.

An embodiment of the present invention provides a method for acquiring a frequency difference. The method includes acquiring a difference T1 between clock timing before dormancy and clock timing of a base station. A dormancy period T is recorded between dormancy start and dormancy end. A difference T2 is acquired between clock timing after dormancy and clock timing of the base station. A frequency difference is computed between a low speed clock and a base station clock according to normalization frequencies T1, T, and T2.

Another embodiment of the present invention further provides a terminal. The terminal includes a first acquiring module that is configured to, before dormancy, receive cell frame timing from a base station, and to perform a subtract operation using the cell frame timing transmitted by the base station and frame timing maintained before dormancy to obtain a difference T1 between clock timing before dormancy and clock timing of the base station. A recording module is configured to record a dormancy period T between dormancy start and dormancy end. A second acquiring module is configured to, after dormancy, search for the cell frame timing transmitted by the base station, to replace cell frame timing maintained in dormancy mode with the searched cell frame timing, and to perform a subtraction operation using the cell frame timing after replacement and the cell frame timing maintained after dormancy to obtain a difference T2 between clock timing after dormancy and clock timing of the base station. A computing module is configured to compute a frequency difference between a low speed clock and a base station clock according to normalization frequencies, T1, T, and T2.

Compared with the prior art, the embodiments of the present invention acquire a frequency difference between a low speed clock and a base station clock according to the timing differences between a terminal before and after dormancy and a base station. Since the dormancy period is rather long, the acquired frequency difference is more precise compared with the prior art.

BRIEF DESCRIPTION OF THE DRAWINGS

To more clearly illustrate the technical solution in embodiments of the present invention, drawings involved in embodiments of the present invention are briefly described. Obviously, the accompanying drawings are merely some embodiments of the present invention. For those of ordinary skill in the art, other accompanying drawings may be derived from these accompanying drawings without creative effort.

DETAILED DESCRIPTION OF THE EMBODIMENTS

The technical solution in embodiments of the present invention is clearly and completely illustrated below with reference to the accompanying drawings. Obviously, the described embodiments are only part, but not all, of the embodiments of the present invention. All other embodiments made by those of ordinary skill in the art based on the embodiments of the present invention without creative effort shall fall within the protection scope of the present invention.

The embodiments of the present invention provide a method and a terminal for acquiring a frequency difference capable to acquire a relatively precise frequency difference between a low speed clock and a base station clock.

To facilitate understanding of embodiments of the present invention, reference is made to the accompanying drawings to describe embodiments of the present invention in detail.

Embodiment 1

Figure 2:
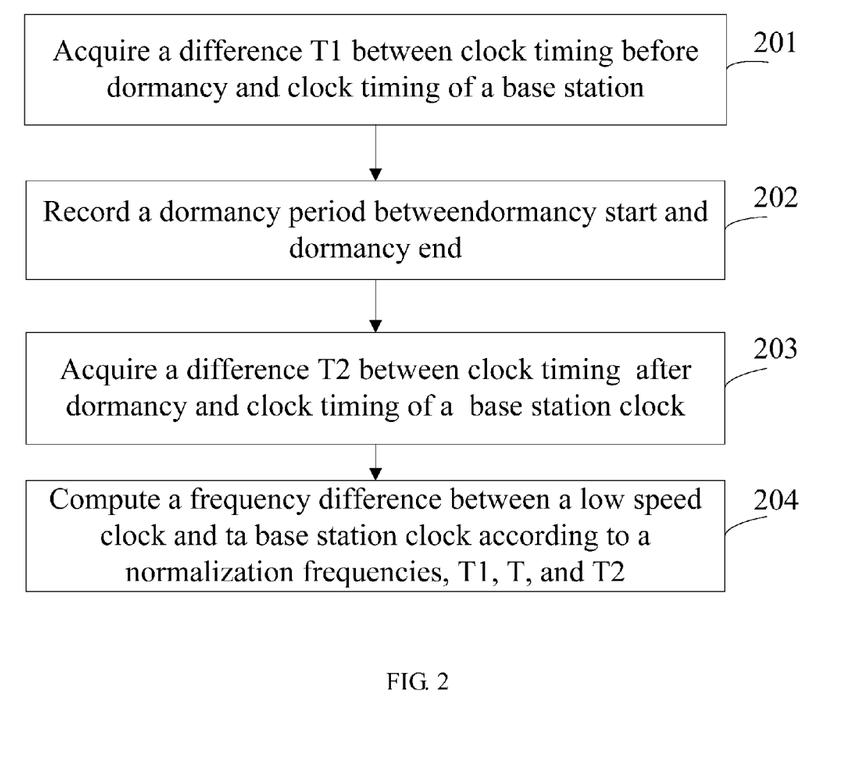
FIG. 2 is a flow chart of a method for acquiring a frequency difference according to an embodiment of the present invention.

FIG. 2 is a flow chart of a method for acquiring a frequency difference according to an embodiment of the present invention. As shown in FIG. 2, the method for acquiring a frequency difference provided in this embodiment of the present invention may include the following blocks.

Block 201: Acquire a difference T1 between clock timing before dormancy and clock timing of a base station.

The acquiring of the difference T1 between clock timing and clock timing of the base station specifically may include receiving cell frame timing from the base station. This information is received by the terminal before dormancy, that is, when the terminal is in work mode or in network paging reception mode. Frame timing currently maintained by the terminal (in work mode or in network paging reception mode) is subtracted from the cell frame timing transmitted by the base station to obtain the difference T1 between the clock timing of the terminal and the clock timing of the base station.

Block 202: Record a dormancy period T between dormancy start and dormancy end.

The terminal records the time when the dormancy starts and the time when the terminal is waken up from the dormancy mode and enters into the work mode or the network paging reception mode, that is, the dormancy is terminated, and obtains the dormancy period T between dormancy start and dormancy end.

Block 203: Acquire a difference T2 between clock timing after dormancy and clock timing of the base station.

The acquiring of T2 specifically may include demodulating paging messages, by the terminal after dormancy, that is, after the terminal is waken up from the dormancy mode and enters into the work mode or the network paging reception mode. The method also includes searching for the cell frame timing transmitted by the base station within a certain time period. After obtaining an accurate cell frame timing, the cell frame timing maintained by the terminal in dormancy mode is replaced with the accurate cell frame timing. Frame timing currently maintained by the terminal (in work mode or in network paging reception mode) is subtracted from the cell frame timing after replacement to obtain a difference T2 between clock timing after dormancy and clock timing of the base station.

After the terminal enters into dormancy state, a low speed clock is used to maintain frame timing of the terminal. The frame timing is prone to errors due to inaccuracy of the low speed clock.

If a frequency difference between the low speed clock and the base station clock is too great, after the terminal is waken up, the T2 value is too great. This results in that the terminal fails to find the cell frame timing within a certain time period. At this time, a cell searching process should be re-initiated to obtain the cell frame timing and other information. The time for searching the cell is much longer than the time for searching the frame timing. A frame timing search refers to searching for accurate frame timing within a certain time window, according to already known rough cell frame timing. The time window cannot be too large, because this multiplies the amount of calculation by times. Nor can the time window be too small, because this will pose a very high requirement for accuracy of the low speed clock.

Block 204: Compute a frequency difference between the low speed clock and the base station clock according to normalization frequencies, T1, T, and T2.

The computing of the frequency difference between the low speed clock and the base station clock according to the normalization frequency, T1, T, and T2 may specifically include subtracting T1 from T2 to obtain a phase offset within the dormancy period T, dividing the phase offset by the dormancy period T to obtain a frequency difference ratio, and multiplying the frequency difference ratio with a normalized frequency of the low speed clock or a normalized frequency of the base station clock to obtain the frequency difference between the low speed clock and the base station clock.

Figure 3:
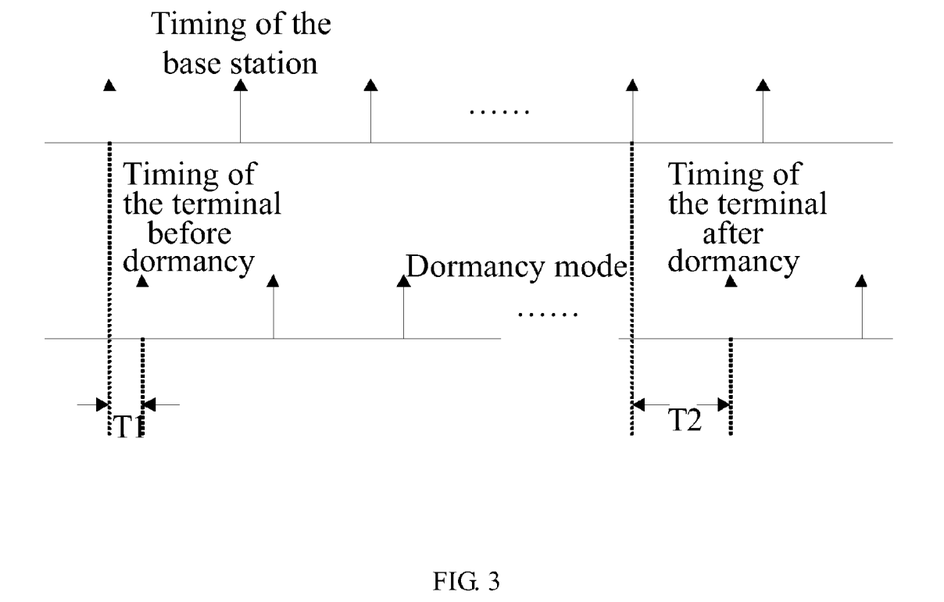
FIG. 3 is a time diagram for illustrating timing of a terminal before dormancy and after dormancy and timing of a base station.

For example, reference can be made to FIG. 3, which is a time diagram illustrating timing of the terminal before and after dormancy and timing of the base station. Assume that before dormancy, that is, when the terminal is in work mode or in network paging reception mode, the terminal receives the cell frame timing transmitted by the base station, and subtracts frame timing maintained by the terminal that is currently in work mode or in network paging reception mode from the cell frame timing transmitted by the base station to obtain the difference T1 between clock timing of the terminal before dormancy and clock timing of the base station.

When the terminal enters into dormancy state, it will use the frequency of the low speed clock to maintain the frame timing of the terminal. When the terminal is waken up from the dormancy state and enters into the work mode or the network paging reception mode, it searches for cell frame timing transmitted by the base station within a certain time period.

After obtaining accurate cell frame timing, the cell frame timing maintained by the terminal in dormancy state is replaced.

Then, frame timing maintained by the terminal in work mode or network paging reception mode is subtracted from the cell frame timing after replacement, and a difference T2 between clock timing of the terminal after dormancy and clock timing of the base station is obtained.

The terminal records the time when the dormancy starts and the time when the terminal is waken up from the dormancy mode and enters into the work mode or the network paging reception mode, that is, the dormancy is terminated, and obtains the dormancy period T between dormancy start and dormancy end.

If the frequency of the low speed clock when the terminal is in dormancy state is completely synchronized to the frequency of the base station clock, T1 should be equal to T2. However, since the frequency of the low speed clock when the terminal is in dormancy state is not precise enough, there must be a difference between T1 and T2. A value of the difference equals to a value of a difference between a normalized frequency M1 of the base station and a normalized frequency Δf3 of the low speed clock.

Assume that a standard frequency for the frequency f1 of the base station is 2140 MHz and a standard frequency for the frequency f3 of the low speed clock is 32.768 KHz, when both f1 and f3 are normalized using 2140 MHz, M1 (normalized value)=f1, and Δf3 (normalized value)=f3×2140×1000/32.768.

The value of the frequency difference between the low speed clock and the base station clock may be calculated using the following formula:

$$\Delta f = \Delta f3 - \Delta f1 = ((T2-T1)/T) \times \Delta f3$$

The above formula may also be expressed as:

$$\Delta f = \Delta f3 - \Delta f1 = ((T2-T1)/T) \times \Delta f1$$

As numerators are far smaller than denominators in the above formulas, errors produced by these two formulas are ignored.

Wherein, "Δf" denotes a difference between the frequency of the low speed clock and the frequency of the base station clock when the terminal is in dormancy state. "T2−T1" denotes a phase offset between the frequency of the low speed clock and the frequency of the base station clock within the dormancy period T. "(T2−T1)/T" denotes a frequency difference ratio between the frequency of the low speed clock and the frequency of the base station clock within the dormancy period T.

After obtaining Δf, if after dormancy of dormancy period T, the terminal is waken up from the dormancy state and enters into the work mode or the network paging reception mode, Δf is added to the frequency of the low speed clock for timing compensation, thereby obtaining accurate timing of the terminal. Thus, synchronization between the terminal clock and the base station clock is achieved. That is, the low speed clock of the terminal is synchronized to the base station clock according to a corresponding frequency difference between the low speed clock and the base station clock.

The foregoing details describe a method for acquiring frequency difference according to an embodiment of the present invention. In this embodiment of the present invention, a frequency difference between the low speed clock and the base station clock is acquired according to the timing differences between the terminal before and after dormancy and the base station. As the period when the terminal is in dormancy state is rather long, the acquired frequency difference is relatively precise, and therefore accurate timing of the terminal is maintained.

Embodiment 2

Figure 4A:
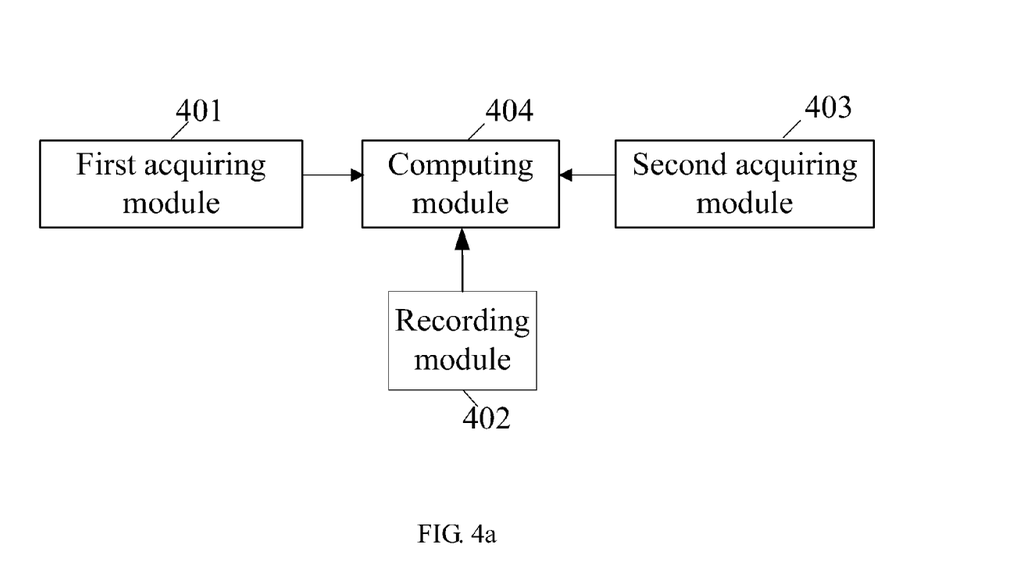
FIG. 4A is a first schematic diagram depicting a logic structure of a terminal according to an embodiment of the present invention.
Figure 4B:
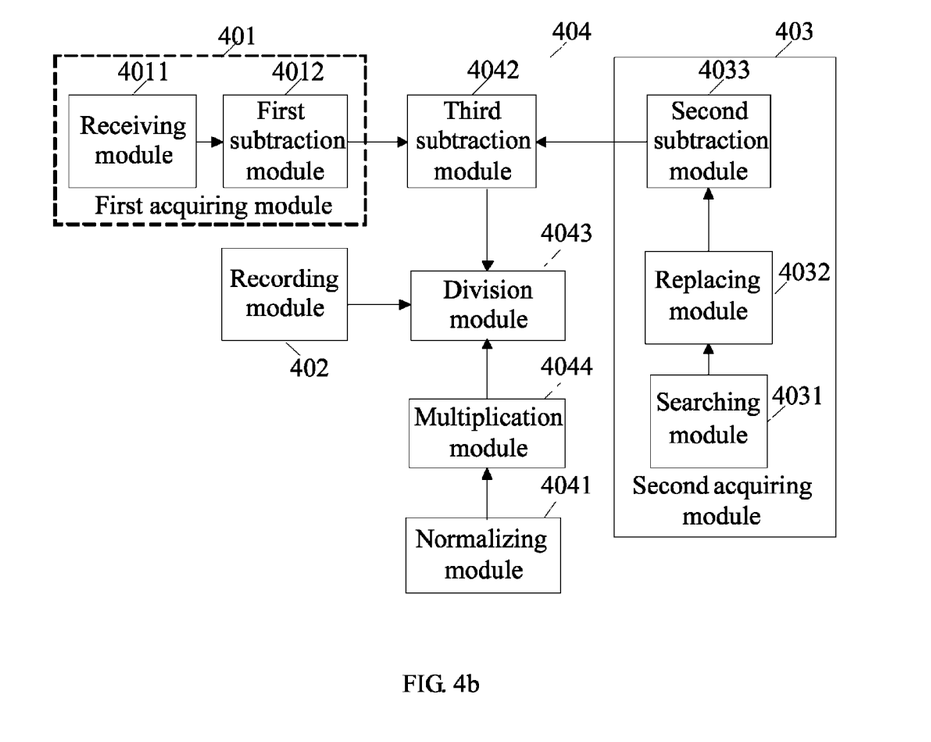
FIG. 4B is a second schematic diagram depicting a logic structure of a terminal according to another embodiment of the present invention.

FIG. 4A and FIG. 4B are schematic diagrams depicting logic structures of a terminal provided in an embodiment of the present invention. As shown in FIG. 4A, the terminal provided in an embodiment of the present invention may include a first acquiring module 401, which is configured to receive a cell frame timing transmitted by a base station, and to perform an subtraction operation using the cell frame timing transmitted by the base station and frame timing maintained before dormancy to obtain a difference T1 between clock timing before dormancy and clock timing of a base station. A recording module 402 is configured to record dormancy period T between dormancy start and dormancy end.

A second acquiring module 403 is configured to, after dormancy, search for the cell frame timing transmitted by the base station, to replace cell frame timing maintained in dormancy state with the searched cell frame timing, and to perform a subtraction operation using the cell frame timing after replacement and the frame timing maintained after dormancy to obtain a difference T2 between clock timing after dormancy and clock timing of the base station. A computing module 404 is configured to compute a frequency difference between the low speed clock and the base station clock according to normalization frequencies T1, T, and T2.

Assume that a standard frequency for the frequency f1 of the base station is 2140 MHz and a standard frequency for the frequency f3 of the low speed clock is 32.768 KHz, when both f1 and f3 are normalized using 2140 MHz, M1 (normalized value)=f1, and Δf3 (normalized value)=f3×2140×1000/32.768.

The value of the frequency difference between the low speed clock and the base station clock may be calculated using the following formula:

$$\Delta f = \Delta f3 - \Delta f1 = ((T2-T1)/T) \times \Delta f3$$

or $$\Delta f = \Delta f3 - \Delta f1 = ((T2-T1)/T) \times \Delta f1$$

As numerators are far smaller than the denominators in the above formulas, errors produced by these two formulas are ignored.

The expression "Δf" denotes a difference between the frequency of the low speed clock and the frequency of the base station clock when the terminal is in dormancy state. The expression "T2−T1" denotes a phase offset between the frequency of the low speed clock and the frequency of the base station clock within the dormancy period T and the expression "(T2−T1)/T" denotes a frequency difference ratio between the frequency of the low speed clock and the frequency of the base station clock within the dormancy period T.

As shown in FIG. 4B, the first acquiring module 401 may include a receiving module 4011, which is configured to, before dormancy, receive cell frame timing transmitted by the base station. A first subtraction module 4012 is configured to perform a subtraction operation using the cell frame timing transmitted by the base station and the frame timing maintained before dormancy to obtain a difference T1 between clock timing before dormancy and clock timing of a base station.

The second acquiring module 403 may include a searching module 4031, which is configured to, after dormancy, search for the cell frame timing transmitted by the base station. A replacing module 4032 is configured to replace the cell frame timing maintained in dormancy state with the cell frame timing searched out by the search module. A second subtraction module 4033 is configured to perform a subtraction operation using the replaced cell frame timing and frame timing maintained after dormancy to obtain a difference T2 between clock timing after dormancy and clock timing of the base station.

As shown in FIG. 4B, the computing module 404 may include a normalizing module 4041, which is configured to normalize the frequency of the low speed clock or normalize a frequency of the base station clock. A third subtraction module 4042 is configured to perform a subtraction operation using T2 and T1 to obtain a phase offset within the dormancy period T. A division module 4043 is configured to divide the phase offset obtained by the third subtraction module 4042 by the dormancy period T recorded by the recording module 402 to obtain a frequency difference ratio. A multiplication module 4044 is configured to multiply the frequency difference ratio obtained by the division module 4043 with the normalized frequency of the low speed clock to obtain the frequency difference between the low speed clock and the base station clock.

Optionally, the normalization module 4041 is configured to normalize the frequency of the base station clock.

The multiplication module 4044 is configured to multiply the frequency difference ratio obtained by the division module 4043 with the normalized frequency of the low speed clock to obtain the frequency difference between the low speed clock and the base station clock.

The foregoing details describe a terminal provided in an embodiment of the present invention. In this embodiment of the present invention, the frequency difference between the low speed clock and the base station clock is acquired according to timing differences between the terminal before and after dormancy and the base station. Since the period when the terminal is in dormancy state is rather long, the acquired frequency difference is relatively precise.

Figure 4C:
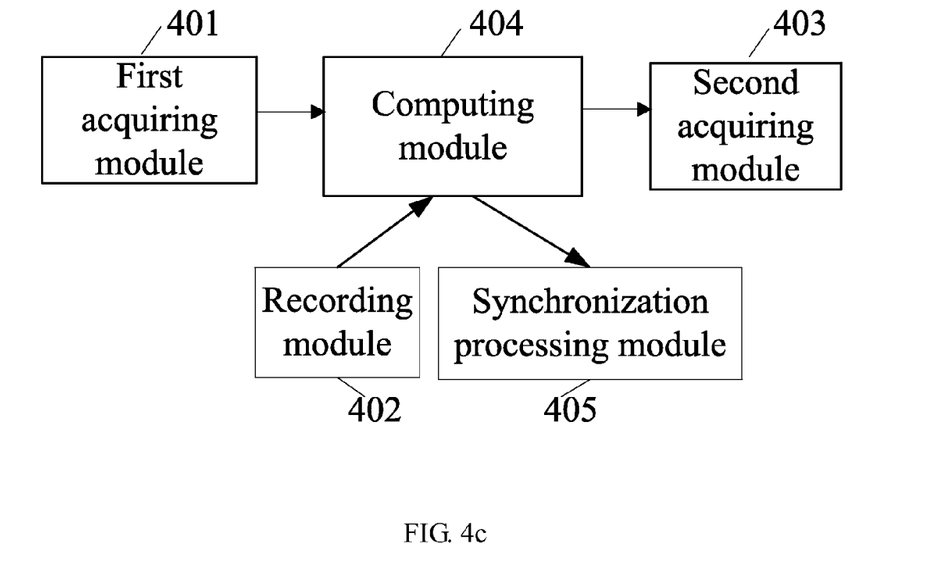
FIG. 4C is a third schematic diagram depicting a logic structure of a terminal according to another embodiment of the present invention.

In the above apparatus, as shown in FIG. 4C, the computing module 404 may be connected to the synchronization processing module 405. The synchronization processing module 405 is configured to implement synchronization between the low speed clock of the terminal and the base station clock, according to the frequency difference between the low speed clock and the base station clock obtained by the computing module 404.

Those of ordinary skill in the art will understand that all or part of the steps of the method according to the embodiments of the present invention may be implemented by programs instructing relevant hardware. The program may be stored in a computer readable storage medium. When executed, the program will implement the steps of the method according to the embodiments of the present invention. The storage medium includes media capable of storing program codes such as a read-only memory (ROM), a random access memory (RAM), a magnetic disk, or an optical disk.

A method and a terminal for acquiring a frequency difference provided in embodiments of the present invention are described in detail above. Specific exemplary embodiments are used for illustrating the principle and implementation mode of the present invention. The description of the above embodiments is merely used for facilitating the understanding of the method and the idea of the present invention. Modification and replacement may be made to the specific implementation mode and applicable scope by those ordinary skilled in the art without departing from the idea of the present invention. Therefore, the present invention shall not be limited to the description herein.

What is claimed is:

1. A method for acquiring a frequency difference, the method comprising:
    acquiring a difference T1 between clock timing before dormancy and clock timing of a base station;
    recording a dormancy period T between dormancy start and dormancy end;
    acquiring a difference T2 between clock timing after dormancy and clock timing of the base station; and
    computing a frequency difference between a low speed clock and a base station clock, wherein computing the frequency difference comprises:
        performing a subtraction operation using the difference T2 and the difference T1 to obtain a phase offset within the dormancy period T;
        dividing the phase offset by the dormancy period T to obtain a frequency difference ratio; and
        multiplying the frequency difference ratio with a normalized frequency of the low speed clock to obtain the frequency difference between the low speed clock and the base station clock, or multiplying the frequency difference ratio with a normalized frequency of the base station clock to obtain the frequency difference between the low speed clock and the base station clock.

2. The method according to claim 1, wherein acquiring the difference T1 comprises:
    receiving, before dormancy, cell frame timing transmitted by the base station; and
    performing a subtraction operation using the cell frame timing transmitted by the base station and cell frame timing maintained before dormancy to obtain the difference T1 between the clock timing before dormancy and the clock timing of the base station.

3. The method according to claim 2, wherein acquiring the difference T2 comprises:
    searching for, after dormancy, the cell frame timing transmitted by the base station;
    replacing cell frame timing maintained in dormancy state with the searched for cell frame timing; and
    performing a subtraction operation using the cell frame timing after replacement and cell frame timing maintained after dormancy to obtain the difference T2 between the clock timing after dormancy and the clock timing of the base station.

4. The method according to claim 1, wherein acquiring the difference T2 comprises:
    searching for, after dormancy, cell frame timing transmitted by the base station;
    replacing cell frame timing maintained in dormancy state with the searched for cell frame timing; and
    performing a subtraction operation using the cell frame timing after replacement and cell frame timing maintained after dormancy to obtain the difference T2 between the clock timing after dormancy and the clock timing of the base station.

5. The method according to claim 1, wherein computing the frequency difference comprises:
    multiplying the frequency difference ratio with the normalized frequency of the low speed clock to obtain the frequency difference between the low speed clock and the base station clock.

6. The method according to claim 1, wherein computing the frequency difference comprises:
    multiplying the frequency difference ratio with the normalized frequency of the base station clock to obtain the frequency difference between the low speed clock and the base station clock.

7. The method according to claim 1, further comprising:
    synchronizing the low speed clock to the base station clock according to the frequency difference between the low speed clock and the base station clock.

8. A terminal, comprising:
    a first acquiring module, configured to, before dormancy, receive cell frame timing transmitted by a base station, and to perform a subtract operation using the cell frame timing transmitted by the base station and frame timing maintained before dormancy to obtain a difference T1 between clock timing before dormancy and clock timing of the base station;

a recording module, configured to record a dormancy period T between dormancy start and dormancy end;

a second acquiring module, configured to, after dormancy, search for the cell frame timing transmitted by the base station, to replace cell frame timing maintained in dormancy state with the searched for cell frame timing, and to perform a subtraction operation using the cell frame timing after replacement and cell frame timing maintained after dormancy to obtain a difference T2 between the clock timing after dormancy and the clock timing of the base station; and a computing module, configured to compute a frequency difference between a low speed clock and a base station clock according to normalization frequencies, T1, T, and T2.

9. The terminal according to claim 8, wherein the first acquiring module comprises:
a receiving module, configured to, before dormancy, receive the cell frame timing transmitted by the base station; and
a first subtraction module, configured to perform a subtraction operation using the cell frame timing transmitted by the base station and the frame timing maintained before dormancy to obtain the difference T1 between the clock timing before dormancy and the clock timing of the base station.

10. The terminal according to claim 9, wherein the second acquiring module comprises:
a searching module, configured to, after dormancy, search for the cell frame timing transmitted by the base station;
a replacing module, configured to replace cell frame timing maintained in dormancy state with the cell frame timing searched for by the searching module; and
a second subtraction module, configured to perform a subtraction operation using the cell frame timing searched for by the searching module and the cell frame timing maintained after dormancy to obtain the difference T2 between the clock timing after dormancy and the clock timing of the base station.

11. The terminal according to claim 10, wherein the computing module comprises:
a normalizing module, configured to normalize a frequency of the low speed clock or to normalize a frequency of the base station clock;
a third subtraction module, configured to perform a subtraction operation using the difference T2 and the difference T1 to obtain a phase offset within the dormancy period T;
a division module, configured to divide the phase offset obtained by the third subtraction module by the dormancy period T recorded by the recording module to obtain a frequency difference ratio; and
a multiplication module, configured to multiply the frequency difference ratio with the normalized frequency of the low speed clock to obtain the frequency difference between the low speed clock and the base station clock, or to multiply the frequency difference ratio with the normalized frequency of the base station clock to obtain the frequency difference between the low speed clock and the base station clock.

12. The terminal according to claim 8, wherein the second acquiring module comprises:

a searching module, configured to, after dormancy, search for the cell frame timing transmitted by the base station;
a replacing module, configured to replace the cell frame timing maintained in dormancy state with the cell frame timing searched for by the searching module; and
a second subtraction module, configured to perform a subtraction operation using the cell frame timing searching for by the searching module and the cell frame timing maintained after dormancy to obtain the difference T2 between the clock timing after dormancy and the clock timing of the base station.

13. The terminal according to claim 8, wherein the computing module comprises:
a normalizing module, configured to normalize a frequency of the low speed clock or to normalize a frequency of the base station clock;
a third subtraction module, configured to perform a subtraction operation using the difference T2 and the difference T1 to obtain a phase offset within the dormancy period T;
a division module, configured to divide the phase offset obtained by the third subtraction module by the dormancy period T recorded by the recording module to obtain a frequency difference ratio; and
a multiplication module, configured to multiply the frequency difference ratio with the normalized frequency of the low speed clock to obtain the frequency difference between the low speed clock and the base station clock.

14. The terminal according to claim 8, wherein the computing module comprises:
a normalizing module, configured to normalize a frequency of the low speed clock or to normalize a frequency of the base station clock;
a third subtraction module, configured to perform a subtraction operation using the difference T2 and the difference T1 to obtain a phase offset within the dormancy period T;
a division module, configured to divide the phase offset obtained by the third subtraction module by the dormancy period T recorded by the recording module to obtain a frequency difference ratio; and
a multiplication module, configured to multiply the frequency difference ratio with the normalized frequency of the base station clock to obtain the frequency difference between the low speed clock and the base station clock.

15. The terminal according to claim 8, wherein the computing module is connected to a synchronization processing module, and the synchronization processing module is configured to synchronize the low speed clock to the base station clock according to the frequency difference between the low speed clock and the base station clock obtained by the computing module.

16. A terminal, comprising:
a first acquiring module, configured to acquire a difference T1 between clock timing before dormancy and clock timing of a base station;
a recording module, configured to record a dormancy period T between dormancy start and dormancy end;
a second acquiring module, configured to acquire a difference T2 between clock timing after dormancy and clock timing of the base station; and
a computing module, configured to:
perform a subtraction operation using the difference T2 and the difference T1 to obtain a phase offset within the dormancy period T;

divide the phase offset by the dormancy period T to obtain a frequency difference ratio; and multiply the frequency difference ratio with a normalized frequency of a low speed clock to obtain a frequency difference between the low speed clock and a base station clock, or multiply the frequency difference ratio with a normalized frequency of the base station clock to obtain the frequency difference between the low speed clock and the base station clock.

17. The terminal according to claim 16, wherein the computing module is connected to a synchronization processing module, and the synchronization processing module is configured to synchronize the low speed clock to the base station clock according to the frequency difference between the low speed clock and the base station clock obtained by the computing module.

18. The terminal according to claim 16, wherein the first acquiring module comprises:

a receiving module, configured to, before dormancy, receive cell frame timing transmitted by the base station; and a first subtraction module, configured to perform a subtraction operation using the cell frame timing transmitted by the base station and cell frame timing maintained before dormancy to obtain the difference T1 between the clock timing before dormancy and the clock timing of the base station.

19. The terminal according to claim 18, wherein the second acquiring module comprises:

a searching module, configured to, after dormancy, search for the cell frame timing transmitted by the base station;

a replacing module, configured to replace cell frame timing maintained in dormancy state with the cell frame timing searched for by the searching module; and a second subtraction module, configured to perform a subtraction operation using the cell frame timing searched for by the searching module and cell frame timing maintained after dormancy to obtain the difference T2 between the clock timing after dormancy and the clock timing of the base station.

20. The terminal according to claim 16, wherein the second acquiring module comprises:

a searching module, configured to, after dormancy, search for cell frame timing transmitted by the base station;

a replacing module, configured to replace cell frame timing maintained in dormancy state with the cell frame timing searched for by the searching module; and a second subtraction module, configured to perform a subtraction operation using the cell frame timing searched for by the searching module and cell frame timing maintained after dormancy to obtain the difference T2 between the clock timing after dormancy and the clock timing of the base station.

* * * * *